US009683108B2

(12) United States Patent
Mizuno et al.

(10) Patent No.: US 9,683,108 B2
(45) Date of Patent: Jun. 20, 2017

(54) ANTIREFLECTIVE LAMINATE (71) Applicants: DAI NIPPON PRINTING CO., LTD., Tokyo (JP); JGC CATALYSTS AND CHEMICALS LTD., Kawasaki-Shi (JP)

(72) Inventors: Utako Mizuno, Tokyo (JP); Midori Nakajo, Tokyo (JP); Seiji Shinohara, Tokyo (JP); Toshio Yoshihara, Tokyo (JP); Hiroyasu Nishida, Kawasaki (JP); Ryo Muraguchi, Kawasaki (JP); Masafumi Hirai, Kawasaki (JP)

(73) Assignees: Dai Nippon Printing Co., Ltd., Shinjuku-Ku (JP); JGC Catalysts and Chemicals Ltd., Kawasaki-Shi, Kanagawa-Ken (JP)

( * ) Notice: Subject to any disclaimer, the term of this patent is extended or adjusted under 35 U.S.C. 154(b) by 0 days.

(21) Appl. No.: 14/867,319

(22) Filed: Sep. 28, 2015

(65) Prior Publication Data

US 2016/0017152 A1   Jan. 21, 2016

Related U.S. Application Data

(62) Division of application No. 10/569,363, filed as application No. PCT/JP2004/012280 on Aug. 26, 2004, now abandoned.

(30) Foreign Application Priority Data

Aug. 28, 2003   (JP) .................................. 2003-304981

(51) Int. Cl.
*C09D 5/00* (2006.01)
*B05D 3/06* (2006.01)
(Continued)

(52) U.S. Cl.
CPC ............... *C09D 5/006* (2013.01); *B05D 3/06* (2013.01); *C09D 4/00* (2013.01); *C09D 7/1216* (2013.01);
(Continued)

(58) Field of Classification Search
CPC . B05D 3/06; C09D 5/006; C09D 4/00; C09D 7/1216; C09D 17/1266
See application file for complete search history.

(56) References Cited

U.S. PATENT DOCUMENTS

| 5,215,839 A | 6/1993 | Yu |
| 6,791,649 B1 | 9/2004 | Nakamura et al. |

(Continued)

FOREIGN PATENT DOCUMENTS

| JP | 07-133105 | 5/1995 |
| JP | 09/222502 A1 | 8/1997 |

(Continued)

OTHER PUBLICATIONS

Japanese Office Action, Japanese Application No. 2011-109691, dated May 17, 2013 (with English translation).
(Continued)

*Primary Examiner* — Dah-Wei D Yuan
*Assistant Examiner* — Kristen A Dagenais
(74) *Attorney, Agent, or Firm* — Burr & Brown, PLLC (57) ABSTRACT

There is provided an antireflective laminate having a low refractive index and excellent mechanical strength, which comprises a coating layer of an ionizing radiation curing-type resin composition comprising ionizing radiation curing group-containing hollow silica fine particles. The antireflective laminate comprises a light transparent base material and at least a low refractive index layer having a refractive index of not more than 1.45 provided on the light transparent base material, wherein the low refractive index layer comprises
(Continued)

an ionizing radiation curing-type resin composition and silica fine particles having an outer shell layer with the interior of the silica fine particles being porous or void, and, for a part or all of the silica fine particles, at least a part of the surface of the silica fine particle has been treated with an ionizing radiation curing group-containing silane coupling agent.

4 Claims, 1 Drawing Sheet

(51) Int. Cl.
    *G02B 1/111*     (2015.01)
    *C09D 1/12*     (2006.01)
    *C09D 4/00*     (2006.01)
    *C09D 7/12*     (2006.01)
    *C08K 3/36*     (2006.01)
    *C08K 7/26*     (2006.01)
    *C08K 9/06*     (2006.01)

(52) U.S. Cl.
    CPC ......... *C09D 7/1266* (2013.01); *C09D 7/1291* (2013.01); *G02B 1/111* (2013.01); *C08K 3/36* (2013.01); *C08K 7/26* (2013.01); *C08K 9/06* (2013.01); *Y10T 428/249953* (2015.04)

(56) References Cited

U.S. PATENT DOCUMENTS

| | | | |
|---|---|---|---|
| 7,670,640 | B2 | 3/2010 | Araki et al. |
| 2002/0068156 | A1 | 6/2002 | Suzuki et al. |
| 2002/0143087 | A1 | 10/2002 | Haubennestel et al. |
| 2003/0087102 | A1 | 5/2003 | Yamaya et al. |
| 2003/0202137 | A1* | 10/2003 | Nakamura ............. G02B 1/111 349/96 |
| 2004/0019176 | A1 | 1/2004 | Araki et al. |
| 2004/0253427 | A1 | 12/2004 | Yokogawa et al. |
| 2005/0038137 | A1 | 2/2005 | Yoshihara et al. |

FOREIGN PATENT DOCUMENTS

| | | |
|---|---|---|
| JP | 11-326601 A1 | 11/1999 |
| JP | 11-326602 A1 | 11/1999 |
| JP | 2001-166104 A1 | 6/2001 |
| JP | 2001-233611 A1 | 8/2001 |
| JP | 200048277 A1 * | 8/2001 |
| JP | 2002-055205 A1 | 2/2002 |
| JP | 2002-317152 A1 | 10/2002 |
| JP | 2003-025510 A1 | 1/2003 |
| JP | 2003-183592 A1 | 7/2003 |
| JP | 2003-202406 A1 | 7/2003 |
| JP | 2003-236991 A1 | 8/2003 |
| TW | 526213 B | 4/2003 |
| WO | 02/18457 A1 | 3/2002 |
| WO | 2004/017105 A1 | 2/2004 |

OTHER PUBLICATIONS

Japanese Office Action, Japanese Application No. 2011-109692, dated May 17, 2013 (with English translation).

Japanese Decision of Rejection, Japanese Patent Application No. 2011-109692, dated Sep. 20, 2013.

* cited by examiner

ANTIREFLECTIVE LAMINATE

CROSS REFERENCE TO RELATED APPLICATION

This application is a division of U.S. application Ser. No. 10/569,363, filed Feb. 24, 2006, which was the National Stage of International Application No. PCT/JP2004/012280, filed Aug. 26, 2004, the entireties of which are incorporated herein by reference.

FIELD OF THE INVENTION

The present invention relates to an antireflective or antireflection laminate having a low refractive index and excellent mechanical strength, which comprises a coating layer of an ionizing radiation curing-type resin composition comprising ionizing radiation curing group-containing hollow silica fine particles.

BACKGROUND OF THE INVENTION

Display surfaces in image display devices such as liquid crystal displays (LCDs) or cathode ray tube display devices (CRTs) are required to cause no significant reflection of light applied from external light sources such as fluorescent lamps from the viewpoint of enhancing the visibility of the image.

The phenomenon that the reflectance is reduced by coating a low refractive index transparent film onto the surface of a transparent object has hitherto been known. The visibility can be improved by providing an antireflection film utilizing this phenomenon onto the display surface of an image display device. Antireflection films are classified into those having a single-layer construction comprising a low refractive index layer onto the display surface and those having a multilayer construction comprising one or a plurality of layers having a medium to high refractive index provided on the display surface from the viewpoint of improving antireflection properties and a low refractive index layer provided on the medium to high refractive index layer(s).

The antireflection film having a single layer structure has a simpler layer construction than the antireflection film having a multilayer structure and thus is superior in productivity and cost performance. On the other hand, the antireflection film having a multilayer structure can improve antireflection properties through a combination of layer constructions and can realize improved performance more easily than the antireflection film having a single-layer structure.

Methods for low refractive index layer formation are generally classified roughly into gas phase methods and coating methods. Gas phase methods include physical methods such as vacuum deposition and sputtering and chemical methods such as CVD, and coating methods include roll coating, gravure coating, slide coating, spray coating, dip coating, and screen printing.

When the low refractive index layer is formed by the gas phase method, a high-function and high-quality transparent thin film can be formed, but on the other hand, accurate atmosphere control in a high vacuum system is necessary. Further, the gas phase method involves a problem that, since a special heating device or ion generating accelerator is used, the production apparatus is complicated, and, thus, the size of the production apparatus is so large that the production cost is necessarily increased. In addition, in the gas phase method, it is difficult to form a large-area transparent thin film or to evenly form a transparent thin film on the surface of a film or the like having a complicated shape.

On the other hand, the formation of the low refractive index layer by spraying, i.e., one of the coating methods, is disadvantageous, for example, in that the utilization efficiency of the coating liquid is low and the regulation of film formation conditions is difficult. The formation of the low refractive index layer by roll coating, gravure coating, slide coating, dip coating, screen printing or the like can realize good utilization efficiency of the film forming material and thus is excellent in mass production and equipment cost, but on the other hand, in general, it involves a problem that the transparent thin film formed by the coating method is inferior to that formed by the gas phase method in function and quality.

It is known that the formation of the low refractive index layer by the coating method may be carried out by coating a coating liquid comprising a polymer containing fluorine atoms in its molecule onto a surface of a base material and drying the coating, or by coating a coating liquid containing a monomer having in its molecule a functional group(s) curable upon exposure to an ionizing radiation or heat onto a surface of a base material, drying the coating, and then applying UV, heat or the like to the dried coating to cure the coating.

In the coating film comprising a fluorine atom-containing binder, the refractive index decreases with increasing the fluorine atom content. Further, the antifouling property improves with increasing the fluorine atom content of the coating film. However, increasing the fluorine atom content of the coating film disadvantageously lowers the hardness and strength of the coating film.

Another method for lowering the refractive index known in the art is that the refractive index of the whole coating film is lowered by bringing the wavelength of air having a refractive index of 1 to not more than the wavelength of the visible light and incorporating this air into the coating film.

Japanese Patent Laid-Open No. 64601/2000 discloses a low refractive index layer having a very fine porous structure formed by forming microvoids having an average diameter of not more than 200 nm in a coating film formed of a fluorine atom-containing polymer. This technique, however, involves a problem that, when the amount of microvoids for lowering the refractive index is excessively large, the hardness and strength of the coating film are lowered.

Japanese Patent Laid-Open No. 3501/1994 discloses a low refractive index layer having a very fine porous structure formed by utilizing voids and the like formed by extraction or gas evolved, for example, by heat decomposition. As with the above technique, however, the technique disclosed in this publication involves a problem that, when the amount of these voids is excessively large, the hardness and strength of the coating film are lowered.

Further, Japanese Patent Laid-Open Nos. 167637/2001 and 225866/2002 disclose a low refractive index layer comprising hollow fine particles having cavities in the interior thereof such as hollow silica dispersed in a binder containing an inorganic component obtained from a hydrolytic polycondensate of an alkoxysilane. This low refractive index layer has the same effect as attained by the low refractive index layer containing a large number of microvoids and, at the same time, has a certain level of coating film hardness because the microvoid is protected by a hard outer shell such as silica.

This low refractive index layer is a highly hard coating film by virtue of the use of an inorganic component-containing binder, but on the other hand, the low refractive index layer suffers from a problem that, due to its poor in resistance to external impact, the mechanical strength, particularly scratch resistance, of the coating film is poor.

Further, by virtue of the aggregating effect of the hollow silica particles, the hardness of the coating film is higher than that of the hollow silica particle-free coating film, but on the other hand, since brittleness is also increased, it is difficult to realize a low-refractive index and highly mechanically strong coating film.

In an earlier application filed by the applicant of this application, there is disclosed an antireflection film having improved mechanical strength, formed by using porous fine particles, which are expected to have the effect of forming microvoids, using fine particle aggregates having voids formed by aggregation among particles, and using, as a binder component, an ionizing radiation curing-type resin composition which can easily regulate mechanical properties (such as elasticity) of the film.

Since, however, increasing the addition amount of the silica particles to some extent causes aggregation of silica fine particles which causes a lowering in mechanical strength of the coating film at a stretch, there is still a demand for an antireflection film which has a low refractive index and excellent mechanical strength.

SUMMARY OF THE INVENTION

In view of the above problems of the prior art, the present invention has been made, and an object of the present invention is to provide an antireflective laminate having a low refractive index and excellent mechanical strength, comprising a coating layer of an ionizing radiation curing resin composition containing ionizing radiation curable group-containing hollow silica fine particles.

The object of the present invention can be attained by an antireflective laminate comprising a light transparent base material and at least a low refractive index layer having a refractive index of not more than 1.45 provided on said light transparent base material, wherein said low refractive index layer comprises an ionizing radiation curing-type resin composition and silica fine particles having an outer shell layer with the interior of said silica fine particles being porous or void, and for a part or all of said silica fine particles, at least a part of the surface of said silica fine particle has been treated with an ionizing radiation curing group-containing silane coupling agent.

According to the present invention, the silica fine particles have fine voids in the exterior and interior parts thereof, and the voids are filled with gas, for example, air having a refractive index of 1. Therefore, the refractive index of the silica fine particles per se is low and, even when the silica fine particles are homogenously dispersed without the formation of any aggregate in the coating film, the refractive index of the coating film can be lowered. Specifically, the refractive index of the void-containing silica fine particles has a lower refractive index of 1.20 to 1.45 which is lower than conventional silica fine particles free from gas in the interior thereof (refractive index n=about 1.46), and, thus, the refractive index of the coating film can be brought to not more than 1.45, preferably not more than 1.40. Further, since voids are protected by an outer shell of fine particles, the formed coating film is compacted by the aggregative force and hardness of the fine particles dispersed in the cured resin composition, contributing to improved mechanical strength of the coating film.

These fine particles are slightly aggregated in the coating film, and, consequently, concaves and convexes having a fineness approximately below the wavelength of the visible light are formed particularly on the outermost surface of the coating film. As a result, a nanoporous structure is formed within or on the surface of the coating film, and, thus, a structure into which air is introduced more easily than the case of a conventional flat film consisting of a resin only can be realized. By virtue of this, the attained effect is expected to be more than that attained by the refractive index possessed by the fine particles. Further, even when the content of silica fine particles based on the resin composition is significantly increased, a significant lowering in hardness and strength of the coating film can be avoided.

Further, since an ionizing radiation curing group-containing silane coupling agent is introduced into at least a part of the surface of the silica fine particles, the affinity for the binder component is improved and homogeneous dispersion of the silica fine particles in the coating liquid or coating film can be realized.

Furthermore, since the ionizing radiation curing group in the silane coupling agent introduced into this surface chemically forms a covalent bond with the ionizing radiation curing group in the binder component directly and/or through an ionizing radiation curing group in a free silane coupling agent, the silica fine particles functions as a cross-linking agent for the binder component. Therefore, even when the content of the silica fine particles based on the resin composition is very high, a significant lowering in hardness and strength of the coating film can be avoided and a low refractive index layer having a low refractive index and possessing excellent mechanical strength can be realized.

DETAILED DESCRIPTION OF THE INVENTION

The low refractive index layer constituting the antireflective laminate according to the present invention comprises an ionizing radiation curing resin composition, which functions as a binder component, and silica fine particles. Each of these components will be described.

1. Ionizing Radiation Curing Resin Composition

Preferably, the ionizing radiation curing resin composition used in the present invention contains a compound that contains, per molecule, at least one hydrogen bond forming group and three or more ionizing radiation curable functional groups (hereinafter often referred to simply as "ionizing radiation curable group"). Thus, when the resin composition contains an ionizing radiation curable group, which is cured upon exposure to an ionizing radiation, and a hydrogen bond forming group which is heat cured either as such or in combination with a curing agent, coating of the coating liquid comprising the resin composition onto the surface of an object followed by drying and ionizing radiation irradiation or ionizing radiation irradiation in combination with heating, can realize the formation of a chemical bond such as a crosslinking bond within the coating film and efficient curing of the coating film.

The term "ionizing radiation curable group" as used herein refers to a functional group that, upon exposure to an ionizing radiation, can allow a polymerization reaction, a crosslinking reaction or the like to proceed to cure the coating film. Examples of such ionizing radiation curable groups include those that a reaction proceeds through a polymerization reaction such as photoradical polymerization, photocation polymerization, or photoanion polymerization, or a reaction mode such as addition polymerization or polycondensation which proceeds through photodimerization. In particular, since ethylenically unsaturated bonds such as (meth)acryloyl, vinyl, and allyl groups cause a photoradical polymerization reaction upon exposure to an ionizing radiation such as ultraviolet light or electron beams either directly or indirectly through the action of an initiator, advantageously, handling in the step of photocuring and the like is relatively easy. Among them, (meth)acryloyl groups are preferred, because they are excellent in productivity and, further, the mechanical strength of the coating film after curing can be easily regulated.

The term "hydrogen bond forming group" as used herein means a functional group that, upon heating, can allow a polymerization reaction, a crosslinking reaction or the like between identical functional groups or between this group and other functional group to proceed to cure the coating film, and examples thereof include alkoxy, hydroxyl, carboxyl, amino, and epoxy group.

Among these functional groups, the hydroxyl group is also excellent in affinity for surface treated silica fine particles and thus can improve dispersibility of the surface treated silica fine particles in the binder. The hydroxyl group can easily be introduced into the binder component and further is adsorbed onto the hydroxyl group on the surface of the silica fine particles. Therefore, the hydroxyl group can be homogeneously dispersed in coating liquids or coating films. Accordingly, the service life of the coating liquid is improved and, at the same time, neither a lowering in transparency of the coating film caused by aggregation of the silica fine particles nor a lowering in coating strength of the film strength takes place. Thus, an even coating film can be formed.

Further, in curing, heat curing of the ionizing radiation curing-type resin composition either alone or in combination with a curing agent results in the formation of a covalent bond between binder components or between a binder and the hydroxyl group on the surface of the silica fine particles to further improve the coating film strength. In this case, the silica fine particles function as a crosslinking agent in the binder.

Monomers which are preferably used in the above ionizing radiation curing-type resin composition include those containing a hydrogen bond forming group such as a hydroxyl group. The hydrogen bond forming group may be such that is by-produced at the time of synthesis and is present as a part of monomers. Specific examples of hydrogen bond forming groups include di(meth)acrylates such as ethylene glycol di(meth)acrylate and pentaerythritol di(meth)acrylate monostearate; tri(meth)acrylates such as trimethylolpropane tri(meth)acrylate and pentaerythritol tri(meth)acrylate; polyfunctional (meth)acrylates such as pentaerythritol tetra(meth)acrylate derivative and dipentaerythritol penta(meth)acrylate.

In addition to these monomers, hydrogen bond forming group-containing oligomers having a number average molecular weight of not more than 20000 (a number average molecular weight in terms of polystyrene as measured by GPC), for example, OH residue-containing epoxyacrylate resins (for example, "Epoxyester", manufactured by Kyoeisha Chemical Co., Ltd. or "Ripoxy", manufactured by Showa High Polymer Co., Ltd.) and urethane acrylate resins produced by polyaddition between various isocyanates and hydroxy-containing monomers through a urethane bond ("Shiko", manufactured by Nippon Synthetic Chemical Industry Co., Ltd. or "Urethane acrylate", manufactured by Kyoeisha Chemical Co., Ltd.) may be preferably used.

These monomers and oligomers are excellent in the effect of enhancing the crosslinking density of the coating film. In addition, since the number average molecular weight is small and is not more than 20000, the fluidity is high and, at the same time, the suitability for coating is excellent.

Further, if necessary, for example, reactive polymers, which are (co)polymers containing a hydrogen bond forming group-containing monomer, and reactive polymers which contain an (meth)acrylate group in the main chain thereof or side chain and have a number average molecular weight of not less than 20000, may be preferably used. These reactive polymers may be commercially available products, for example, "MACROMONOMER" (manufactured by TOAGOSEI CO., LTD.). Further, an (meth)acrylate group-containing reactive polymer may be produced by previously polymerizing methyl methacrylate and glycidyl methacrylate to prepare a copolymer and then condensing a glycidyl group with a carboxyl group in methacrylic acid or acrylic acid.

The presence of these components having a large molecular weight can improve film forming properties for base materials having a complicated shape such as an antidazzling layer and, at the same time, can reduce curling or warpage of the antireflective laminate by volume shrinkage upon curing.

The above monomers, oligomers, polymers, and monomers, oligomers and polymers not belonging to the above monomers, oligomers, and polymers may be used in proper combination to regulate various properties, for example, film forming properties, suitability for coating, crosslinking density for ionizing radiation curing, and content of a heat curable hydrogen bond forming group. For example, monomers and oligomers can improve crosslinking density and suitability for processing, and polymers can improve film forming properties of the coating composition.

In the present invention, a proper combination of a monomer and/or oligomer having a number average molecular weight of not more than 20000 with a polymer having a number average molecular weight of not less than 20000 can realize easy regulation of various properties of the coating film.

2. Silica Fine Particles

The "silica fine particles having an outer shell layer and having a porous or cavity interior structure" as used herein means those having a structure comprising silica fine particles and gas filled into the interior of the silica fine particles and/or a gas-containing porous structure. When the gas is air having a refractive index of 1.0, as compared with the refractive index inherent from that of the fine particles, the refractive index lowers proportionally to the proportion of air in the fine particles.

The refractive index of the silica fine particles used in the antireflective laminate according to the present invention may be 1.20 to 1.44 and is not particularly limited. Such silica fine particles include composite oxide sols or hollow silica fine particles disclosed, for example, in Japanese Patent Laid-Open Nos. 133105/1995 and 233611/2001. A specific production process of such hollow silica fine particles comprises the following first to third steps. In a preferred embodiment of the present invention, a fourth step may be added.

Specifically, in the first step, an aqueous alkali solution of a silica raw material and an aqueous alkali solution of an inorganic oxide raw material other than silica are prepared separately from each other. Alternatively, an aqueous solution of a mixture of both the raw materials is prepared. Next, the aqueous solution(s) thus obtained is (are) gradually added with stirring to an aqueous alkali solution having a pH value of not less than 10, depending upon the compounding ratio of the contemplated composite oxide. Instead of the first step, a previously prepared dispersion liquid containing seed particles may be used as the starting material.

Next, in the second step, at least a part of elements other than silicon and oxygen is selectively removed from colloid particles comprising a composite oxide prepared in the above step. Specifically, the elements in the composite oxide can be removed by dissolution removal using a mineral acid or an organic acid, or by ion-exchange removal through contact with a cation exchange resin.

Subsequently, in the third step, the surface of colloidal particles is coated with a polymer of a hydrolytic organosilicon compound, a silicic acid liquid or the like by adding a hydrolytic organosilicon compound, a silicic acid liquid or the like to colloid particles of the composite oxide from which a part of the elements has been removed. Thus, a composite oxide sol described in the above publication can be produced.

Further, in the fourth step in the present invention, hydrothermal treatment of the silica fine particles prepared above in a temperature range of 50 to 300° C. is preferred. In the silica fine particles produced in the above production process, various low-molecular compounds are present as ionic impurities on the surface thereof. These impurities are those contained in the starting material of the silica fine particles or those derived from additives or the like added in the production process. In the present invention, the amount of impurities present on the surface of the silica fine particles is brought to a predetermined level or below by removing the ionic impurities by hydrothermal treatment.

Specifically, the content of the alkali metal oxide in the silica fine particles is not more than 10 ppm, preferably not more than 5 ppm, more preferably not more than 2 ppm. In particular, when the content of the alkali metal oxide is brought to not more than 5 ppm, the stability of the silica fine particle-containing coating liquid is improved. Specifically, even when the coating liquid is stored for a long period of time, a viscosity rise of the coating liquid can be suppressed and, consequently, excellent storage stability can be realized. When the content of the alkali metal oxide falls within the above-defined range, it is considered that a reaction of the surface of the silica fine particle with the silane coupling agent occurs more strongly. Consequently, the coating film strength is also improved. When the content of the alkali metal oxide exceeds 10 ppm, the film forming property is deteriorated and, hence, the strength of the coating film becomes unsatisfactory. The content of the alkali metal oxide refers to the content as $M_2O$, wherein M represents an alkali metal, and may be measured by conventional atomic absorption spectroscopy or ICP MS measurement.

Specifically, the content of ammonia (containing ammonium ion) in the silica fine particles is not more than 2000 ppm, preferably not more than 1500 ppm, more preferably not more than 1000 ppm. In particular, when the content of ammonia is brought to not more than 1500 ppm, the stability of the silica fine particle-containing coating liquid is improved. Specifically, even when the coating liquid is stored for a long period of time, a viscosity rise of the coating liquid can be suppressed and, consequently, excellent storage stability can be realized. When the content of the alkali metal oxide falls within the above-defined range, it is considered that a reaction of the surface of the silica fine particle with the silane coupling agent occurs more strongly. Consequently, the coating film strength is also improved. When the content of ammonia exceeds 2000 ppm, as with the above case, the film forming property is deteriorated and, hence, the strength of the coating film becomes unsatisfactory. The content of ammonia (containing ammonium ion) in the silica fine particles refers to the content as $NH_3$, and may be measured by a conventional chemical analytical method.

In order that the content of impurity compounds in the silica fine particles is brought to the above-defined range, in the fourth step in the present invention, the hydrothermal treatment step may be repeated a plurality of times. The content of the alkali metal oxide and/or ammonia (containing ammonium ion) in the resultant silica fine particles can be reduced by repeating the hydrothermal treatment.

When the hydrothermal treatment temperature is below 50° C., the content of the alkali metal oxide and/or ammonia in the finally obtained silica fine particles or silica fine particle dispersion liquid is not effectively reduced. Therefore, the storage stability of the coating liquid is not improved, and, further, an improvement in film strength cannot be expected. On the other hand, when the hydrothermal treatment temperature exceeds 300° C., the storage stability of the coating liquid and the film strength are not improved and, in some cases, silica fine particles are aggregated.

The average particle diameter of silica fine particles used in the present invention is preferably in the range of 5 to 100 nm, preferably in the range of 30 to 60 nm. The silica fine particles used are properly selected depending upon the thickness of the coating film to be formed, and the thickness of the coating film is preferably in the range of two-thirds to one-tenth of the coating film.

When the average particle diameter of the silica fine particles is in the range of 5 to 100 nm, the outer shell layer in the silica fine particles is preferably in the range of 1 to 30 nm, preferably in the range of 2 to 20 nm. When the thickness of the outer shell layer is less than 1 nm, in some cases, the particle cannot be fully covered with the outer shell layer. In this case, in some cases, for example, the binder component enters the interior of the fine particles to reduce the cavities in the interior of the fine particles and to reduce the porous structure of the fine particle, and the effect attained by the low refractive index is unsatisfactory. On the other hand, when the thickness of the outer shell layer exceeds 30 nm, in some cases, the porosity of the fine particles is lowered making it impossible to satisfactorily attain the effect of the low refractive index.

In the silica fine particles in the present invention, the hard outer shell layer of silica has an interior cavity or porous structure. Therefore, when the silica fine particles are used in combination with the binder component, the film strength is also improved and a refractive index of not more than 1.45 necessary as a low refractive index layer can be easily realized.

The silica fine particles are those which have further subjected to surface treatment with a silane coupling agent containing acryloyl and/or methacryloyl groups. The surface treatment of the silica fine particles can improve affinity for an ionizing radiation curing-type resin composition binder composed mainly of an organic component.

Consequently, silica fine particles can be homogeneously dispersed in the coating liquid or the coating film, and a deterioration in transparency and coating strength caused by aggregation among silica fine particles and an increase in particle size can be prevented.

The silane coupling agent containing acryloyl group and/or methacryloyl group is curable with an ionizing radiation and is easily reacted with the ionizing radiation curing group in the binder component, and the silica fine particles in the coating film is fixed in the binder component. Specifically, the silica fine particles function as a crosslinking agent in the binder, whereby the hardness of the coating film is improved by the tightening effect of the whole film and, further, the hardness can be imparted while maintaining flexibility inherent in the binder component. Accordingly, by virtue of the deformation of the coating film per se, the coating film has external impact absorbing force and restoring force after the deformation and, thus, the occurrence of damage can be prevented.

In the present invention, an antireflective laminate having improved coating strength can be provided by bringing the content of the impurity compound in the silica fine particles, that is, the content of the alkali metal oxide and the content of ammonia, to the above-defined respective ranges and introducing a silane coupling agent into the silica fine particles having a low impurity content. Although the reason for this has not been elucidated yet, the reason is believed to reside in that the reaction of the surface of the silica fine particles with the silane coupling agent takes place more strongly by bringing the content of the impurities to a predetermined level or less.

Examples of silane coupling agents necessary for the surface treatment of the silica fine particles include
3-methacryloxypropyltrimethoxysilane,
3-methacryloxypropyltriethoxysilane,
3-acryloxypropyltrimethoxysilane,
3-acryloxypropyltriethoxysilane,
3-methacryloxypropylmethyldimethoxysilane,
3-methacryloxypropylmethyldiethoxysilane,
2-methacryloxypropyltrimethoxysilane,
2-methacryloxypropyltriethoxysilane,
N-2(aminoethyl)-γ-aminopropylmethyldimethoxysilane,
N-2(aminoethyl)-γ-aminopropyltrimethoxysilane, and
N-2(aminoethyl)-γ-aminopropyltriethoxysilane.

The amount of the silane coupling agent for the treatment of the silica fine particles is preferably in the range of 1 to 50% by weight, particularly 2 to 30% by weight, based on the silica fine particles. When the amount of the silane coupling agent for the treatment of the silica fine particles is less than 1% by weight, the affinity of silica fine particles for the ionizing radiation curing-type resin composition binder is unsatisfactory. On the other hand, when the amount exceeds 50% by weight, the amount of the free silane coupling agent remaining unused in the treatment of the silica fine particles is so large that the coating film is hard, and is brittle due to a lowering in restorability upon exposure to external impact, resulting in an increased incidence of cracking or damage.

The silica fine particles may be treated with a silane coupling agent by any conventional method without particular limitation, so far as the dispersibility in the organic solvent and the affinity of the silica fine particles for the ionizing radiation curing-type resin composition can be improved. For example, the silica fine particles may be surface treated by adding a predetermined amount of a silane coupling agent to a silica particle dispersion liquid and optionally conducting acid or alkali treatment or heat treatment.

In the present invention, all the silane coupling agents may not be necessarily introduced into the surface of the silica fine particles, and a part of them may be present in the coating liquid either solely or as a condensate. The silane coupling agent has excellent affinity for the binder component and the silica fine particles and thus can stably disperse the silica fine particles in the coating liquid. Further, in curing by exposure to an ionizing radiation or heat, the silane coupling agent is incorporated in the film and functions as a crosslinking agent. Therefore, in this case, as compared with the introduction of the whole quantity of the silane coupling agent into the surface of the silica fine particles, the properties of the coating film can be improved.

The low refractive index layer constituting the antireflective laminate according to the present invention comprises 70 to 250 parts by weight, preferably 80 to 220 parts by weight, more preferably 100 to 200 parts by weight, based on 100 parts by weight of the ionizing radiation curing-type resin composition, of the above surface treated silica fine particles. When the amount of the surface treated silica fine particles is not more than 70 parts by weight, any desired refractive index cannot be obtained. On the other hand, when the amount of the surface treated silica fine particles is not less than 250 parts by weight, the amount of the binder based on the silica fine particles is reduced, resulting in deteriorated coating film strength.

3. Other Components

Preferably, the low refractive index layer in the antireflective laminate according to the present invention further comprises a fluorocompound and/or a silicon compound which are compatible with both the ionizing radiation curing-type resin composition and the silica fine particles. The incorporation of the fluorocompound or the like can realize flattening of the coating film surface and can impart slipperiness which is effective in improving antifouling properties and scratch resistance required of the antireflective laminate. The term "compatible" as used herein means that the compound has an affinity on such a level that, even when a fluorocompound and/or a silicon compound are added to a coating film, containing an ionizing radiation curing-type resin composition and silica fine particles, in such an amount that the above addition effect can be confirmed, a lowering in transparency of the coating film caused, for example, by clouding or an increase in haze is not noticed.

Further, In the present invention, preferably, at least a part of the fluorocompound and/or silicon compound, together with the ionizing radiation curing-type resin composition, chemically forms a covalent bond and is fixed onto the outermost surface of the coating film, whereby slip properties can be stably imparted and antifouling properties and scratch resistance, which the antireflective laminate should have after productization, can be maintained for a long period of time.

Examples of preferred fluorocompounds include those containing a perfluoroalkyl group represented by $C_dF_{2d+1}$ wherein d is an integer of 1 to 21, a perfluoroalkylene group represented by $—(CF_2CF_2)_g—$ wherein g is an integer of 1 to 50, or a perfluoroalkyl ether group represented by $F—(—CF(CF_3)CF_2O—)_e—CF(CF_3)$ wherein e is an integer of 1 to 50, and a perfluoroalkenyl group such as $CF_2=CFCF_2CF_2—$, $(CF_3)_2C=C(C_2F_5)—$, or $((CF_3)_2CF)_2C=C(CF_3)—$.

So far as the flurocompound contains the above functional group, the structure of the fluorocompound is not particularly limited, and, for example, polymers of fluoromonomers and copolymers of fluoromonomers with nonfluoromonomers may also be used. Among them, a block copolymer or graft copolymer comprising a fluoropolymer segment comprised of either a homopolymer of a fluoromonomer or a copolymer of a fluoromonomer with a nonfluoromonomer, and a nonfluoropolymer segment is particularly preferred. In this copolymer, the fluoropolymer segment functions mainly to enhance antifouling properties and water/oil repellent properties. On the other hand, the nonfluoropolymer segment has the function of enhancing compatibility with the binder component, that is, an anchor function. Accordingly, in the antireflective laminate using the above copolymer, even when the surface is repeatedly rubbed, these fluorocompounds are less likely to be removed, and, thus, various properties such as antifouling properties can be maintained for a long period of time.

The above fluorocompounds are commercially available. For example, Modiper F series manufactured by Nippon Oils & Fats Co., Ltd., and Defensa MCF series manufactured by Dainippon Ink and Chemicals, Inc. are preferred.

Preferably, the fluorocompound and/or silicocompound have a structure represented by general formula:

wherein Ra represents an alkyl group having 1 to 20 carbon atoms such as a methyl group; Rb represents an alkyl group having 1 to 20 carbon atoms, an alkoxy group having 1 to 3 carbon atoms, or a polyether modified group, which are unsubstituted or substituted by an amino group, an epoxy group, a carboxyl group, a hydroxyl group, a perfluoroalkyl group, a perfluoroalkylene group, a perfluoroalkyl ether group, or an (meth)acryloyl group; Ra's may be the same or different and Rb's may be the same or different; and m is an integer of 0 to 200 and n is an integer of 0 to 200.

The polydimethylsilicone having a base skeleton represented by the above general formula is generally known to have low surface tension and excellent water repellency and releasability. The introduction of various functional groups into the side chain or the end can impart further effect. For example, the introduction of an amino, epoxy, carboxyl, hydroxyl, (meth)acryloyl, or alkoxy group can impart reactivity, and a covalent bond can be formed by a chemical reaction with the ionizing radiation curing-type resin composition. Further, the introduction of a perfluoroalkyl, perfluoroalkylene, or perfluoroalkylether group can impart oil resistance, lubricity and the like, and the introduction of a polyether modification group can improve leveling properties and lubricity.

Such compounds are commercially available. For example, various modified silicon oils such as fluoroalkyl-containing silicon oil FL100 (manufactured by The Shin-Etsu Chemical Co., Ltd.) and polyether modified silicone oil TSF4460 (tradename, manufactured by GE Toshiba Silicone Co., Ltd.) are available depending upon purposes.

In a preferred embodiment of the present invention, the fluorocompound and/or silicocompound may have a structure represented by general formula:

$$Ra_nSiX_{4-n}$$

wherein Ra represents a hydrocarbon group having 3 to 1000 carbon atoms containing a perfluoroalkyl group, a perfluoroalkylene group, or a perfluoroalkyl ether group; X represents a hydrolytic group, for example, an alkoxy group having 1 to 3 carbon atoms such as a methoxy, ethoxy, or propoxy group, an oxyalkoxy group such as a methoxymethoxy or methoxyethoxy group, or a halogen group such as a chloro, bromo, or iodo group, and X's may be the same or different; and n is an integer of 1 to 3.

The effect attained by the incorporation of the above hydrolytic group is that a covalent bond or a hydrogen bond is easily formed particularly with an inorganic component, which is a hydroxyl group in the silica component according to the present invention, and, thus, the adhesion can be maintained.

Specific examples of such compounds include fluoroalkylsilanes such as TSL8257 (manufactured by GE Toshiba Silicone Co., Ltd.).

The content of the fluorocompound and/or silicocompound is preferably 0.01 to 10% by weight, preferably 0.1 to 3.0% by weight, based on the total weight of the ionizing radiation curing-type resin composition and the silica fine particles. When the content is less than 0.01% by weight, satisfactory antifouling properties and slip properties cannot be imparted to the antireflective laminate. On the other hand, when the content exceeds 10% by weight, the strength of the coating film is extremely lowered.

These fluorocompounds and silicocompounds may be used depending upon the level of the contemplated effect either solely or as a mixture of two or more of them. When these compounds are used in proper combination, various properties such as antifouling properties, water repellent and oil repellent properties, slip properties, scratch resistance, durability, and leveling properties may be regulated to develop contemplated functions.

The low refractive index layer constituting the antireflective laminate according to the present invention comprises the above ionizing radiation curing-type resin composition component and the above surface treated silica fine particle component as indispensable components and, in a preferred embodiment, contains the above fluorocompound and/or silicon compound. If necessary, any binder component other than the above ionizing radiation curing-type resin composition component may also be contained. The coating liquid for low refractive index layer formation may further contain solvents, polymerization initiators, curing agents, crosslinking agents, ultraviolet screening agents, ultraviolet absorbers, and surface conditioning agents (leveling agents) or other components.

In the present invention, the polymerization initiator is not necessarily indispensable. However, when the ionizing radiation curable group in the ionizing radiation curing-type resin composition component, the surface treated silica fine particle component, and other binder component as the optional component is difficult to directly cause a polymerization reaction upon ionizing radiation irradiation, a proper initiator is preferably used depending upon the reaction form of the binder component and the silica fine particles.

For example, when the ionizing radiation curable group in the ionizing radiation curing-type resin composition component is an (meth)acryloyl group, a photoradical polymerization inititator is used. Examples of photoradical polymerization initiators include acetophenones, benzophenones, ketals, anthraquinones, thioxanthone, azo compounds, peroxides, 2,3-dialkyldione compounds, disulfide compounds, thiuram compounds, and fluoroamine compounds. More specific examples thereof include 1-hydroxy-cyclohexyl-phenyl-ketone, 2-methyl-1-[4-(methylthio)phenyl]-2-morpholinopropan-1-one, benzyl dimethyl ketone, 1-(4-dodecylphenyl)-2-hydroxy-2-methylpropan-1-one, 2-hydroxy-2-methyl-1-phenylpropan-1-one, 1-(4-isopropylphenyl)-2-hydroxy-2-methylpropan-1-one, and benzophenone. Among them, 1-hydroxy-cyclohexyl-phenyl-ketone and 2-methyl-1-[4-(methylthio)phenyl]-2-morpholinopropan-1-one, even when the amount thereof is small, initiate and accelerate the polymerization reaction upon ionizing radiation irradiation and thus is preferred in the present invention. They may be used either solely or in a combination of both of them. They may be commercially available products, and, for example, 1-hydroxy-cyclohexyl-phenyl-ketone is available from Ciba Specialty Chemicals, K.K. under the designation of Irgacure 184.

When a photoradical polymerization initiator is used, the photoradical polymerization initiator is generally incorporated in an amount of 3 to 15 parts by weight based on 100 parts by weight in total of the binder component composed mainly of the ionizing radiation curing-type resin composition.

The curing agent is incorporated to accelerate the heat curing reaction in the hydrogen bond forming group contained in a part of the ionizing radiation curing-type resin composition, the silanol group present on the surface of surface treated silica fine particles, the silane coupling agent used for surface treatment, and a condensate thereof in its unreacted part.

When the heat curing polar group is a hydroxyl group, a compound containing a basic group such as methylolmelamine, and a compound containing a hydrolyzable group capable of generating a hydroxyl group upon hydrolysis such as a metal alkoxide are generally used as the curing agent. The basic group is preferably an amine, nitrile, amide, or isocyanate group, and the hydrolyzable group is preferably an alkoxy group. In the latter case, an aluminum compound and/or its derivative represented by general formula:

wherein the residue R's, which may be the same or different, represent a halogen, an alkyl, alkoxy, or acyloxy group having 10 or less, preferably 4 or less, carbon atoms, or a hydroxy group, and a part or all of these groups may be replaced with a chelate ligand, are highly compatible with the hydroxyl group and thus are particularly preferably used. The above compounds may be selected from aluminum compounds and/or oligomers and/or complexes derived therefrom, and aluminum salts of inorganic or organic acids.

Specific examples thereof include aluminum-sec-butoxide, aluminum-iso-propoxide, and their complexes with acetylacetone, ethyl acetoacetate, alkanolamines, glycols, and their derivatives.

When the curing agent is used, the curing agent is generally incorporated in an amount of 0.05 to 30.0 parts by weight based on 100 parts by weight in total of the binder component composed mainly of the ionizing radiation curing-type resin composition.

4. Composition for Low Refractive Index Layer Formation

The low refractive index layer comprising the above components may be formed by dissolving the above components in a solvent to prepare a composition for low refractive index layer formation, subjecting the composition to dispersion treatment by a conventional preparation method to prepare a coating liquid, coating the coating liquid onto a base material, and drying the coating.

The solvent, the method for the preparation of a composition for low refractive index layer formation, and the method for coating film formation will be described.

(1) Solvent

When a relatively large amount of the liquid ionizing radiation curing-type resin composition is used as the binder component, the monomer and/or oligomer in the composition can function also as a liquid medium, in some cases, the composition can be prepared in a coating liquid form without any solvent. Accordingly, in the present invention, the solvent is not necessarily required. In many cases, however, a solvent is used for dissolving and dispersing the solid component and regulating the concentration to prepare a coating liquid having excellent suitability for coating.

The solvent used for dissolving and dispersing the solid component in the low refractive index layer according to the present invention is not particularly limited, and various organic solvents, for example, alcohols such as isopropyl alcohol, methanol, and ethanol; ketones such as methyl ethyl ketone, methyl isobutyl ketone, and cyclohexanone; esters such as ethyl acetate and butyl acetate; aromatic hydrocarbons such as halogenated hydrocarbons, toluene, and xylene; or mixtures thereof may be used.

A ketone organic solvent is preferably used as the solvent. When the coating liquid is prepared using the ketone solvent, the coating liquid can be evenly and thinly coated in an easy manner onto the surface of the base material. Further, the evaporation rate of the solvent after coating is appropriate, and unevenness of drying is less likely to occur. Thus, an evenly thin and large-area coating film can be easily formed.

In order to impart a function as an anti-dazzling layer to the hardcoat layer as a support layer in the antireflective laminate, a construction is sometimes adopted in which the surface of the hardcoat layer is formed in a fine concave-convex form and a low refractive index layer is formed on the fine concaves and convexes through or without through a medium refractive index layer or a high refractive index layer. When the coating liquid is prepared using a ketone solvent, the coating liquid can be evenly coated on the fine concave-convex surface and, thus, uneven coating can be prevented.

A single solvent of a single ketone, a mixed solvent composed of two or more ketones, and a combination of one or at least two ketones with other solvent, which does not lose properties as the ketone solvent may be used as the ketone solvent. Preferred are ketone solvents comprising one or at least two ketones and having a ketone content of not less than 70% by weight, particularly preferably not less than 80% by weight, based on the solvent.

The solvent content is properly regulated to such a level that the solvent can homogeneously dissolve and disperse the components, and, at the same time, silica fine particles do not aggregate even after standing after the preparation, and the coating liquid is not excessively dilute at the time of coating. Preferably, a high-concentration coating liquid is prepared by reducing the addition amount of the solvent to such a range that satisfies this requirement. This is advantageous in that the high-concentration coating liquid can be stored in a small volume state and, in use, for coating, can be diluted to a suitable concentration. When the total amount of the solid content and the solvent is 100 parts by weight, a low refractive index composition which is particularly excellent in dispersion stability and is suitable for long-term storage can be produced by using 50 to 95.5 parts by weight of the solvent based on 0.5 to 50 parts by weight of the total solid content, more preferably 70 to 90 parts by weight of the solvent based on 10 to 30 parts by weight of the total solid content.

(2) Preparation of Composition

A composition for low refractive index layer formation can be prepared by mixing the above individual indispensable components and optional desired components in any desired order. When the surface treated silica fine particles are in a colloidal form, they as such may be mixed. On the other hand, in the case of a powder form, the composition for low refractive index layer formation can be produced by introducing a medium such as beads into the resultant mixture and subjecting the mixture to proper dispersion treatment, for example, in a paint shaker or a bead mill.

(3) Formation of Coating Film

When the coating film is formed using the composition for low refractive index layer formation, a coating liquid containing an ionizing radiation curing-type resin composition, surface treated silica fine particles, and a fluorocompound and/or a silicocompound, and various additives is coated onto the surface of an object to form a coating which is then dried and exposed to an ionizing radiation and/or heat for curing.

The composition for low refractive index layer formation may be coated, for example, by spin coating, dip coating, spray coating, slide coating, bar coating, roll coating, meniscus coating, flexographic printing, screen printing, and bead coating.

5. Base Material

The base material constituting the antireflective laminate according to the present invention may be in either a plate form or a film form. Preferred base materials include, for example, films formed of various resins such as cellulose triacetate (TACs), polyethylene terephthalate (PETs), diacetyl cellulose, cellulose acetate butyrate, polyethersulfone, acrylic resins, polyurethane resins, polyesters, polycarbonates, polysulfones, polyethers, trimethylpentenes, polyether ketones, (meth)acrylonitriles, and cyclic polyolefins. The thickness of the base material is generally about 30 to 200 µm, preferably 50 to 200 µm.

A coating film which is excellent in adhesion to the surface of an object by virtue of the action of a heat curing polar group can be formed by coating the coating liquid of the composition for low refractive index layer formation onto the surface of a base material as an object either directly or through other layer such as a hardcoat layer, and then drying the coating.

6. Antireflective Laminate

Next, an antireflective laminate in a preferred embodiment of the present invention will be described.

The antireflective laminate according to the present invention is an antireflective film having a single-layer or multilayer structure, which is transparent to light and comprises a single layer or a laminate of at least two layers different from each other in refractive index (light transparent layer). In this case, one layer of them, particularly a low refractive index layer, is formed of the above composition. In the present invention, the layer having the highest refractive index in the multilayered antireflection film is called "high refractive index layer," and the layer having the lowest refractive index is called "low refractive index layer." Other layer(s) having a refractive index intermediate between the high refractive index layer and the low refractive index layer is called "medium refractive index layer."

The provision of even only one layer of a coating film formed of the composition used in the present invention onto a surface covered with the antireflective laminate, for example, a display surface in an image display device, can provide an antireflection effect when the balance between the refractive index of the covering surface per se and the refractive index of the coating film is good. Accordingly, the antireflective laminate according to the present invention sometimes effectively functions also as an antireflective laminate having a single layer structure.

The antireflective laminate according to the present invention is particularly suitable for the formation of at least one layer, particularly a low refractive index layer, in an antireflection film having a multilayer structure, for covering a display surface of image display devices such as liquid crystal displays (LCDs) or cathode-ray tube display devices (CRTs), plasma display panels (PDPs), and electroluminesent displays (ELDs), and for covering a surface of image forming media such as projection screens.

In order to attain a desired antireflection effect, the layer construction of the antireflective laminate according to the present invention is that, the low refractive index layer is provided as the outermost layer, and the antireflective laminate may be constituted by any of the low refractive index layer alone, a laminate of high refractive index layer/low refractive index layer, and a laminate of medium refractive index layer/high refractive index layer/low refractive index layer. For all these layers, the layer thickness is in the range of 0.05 to 0.15 µm, preferably 0.07 to 0.12 µm. When the layer thickness is in the above-defined range, a satisfactory antireflection effect can be attained.

The antireflective laminate may be provided directly on the base material, or alternatively on the hardcoat layer. In order to diffuse light from the outside for glaring reduction purposes, concaves and convexes may be formed on the surface of the hardcoat layer. Further, when an anti-dazzling (anti-glare) layer, in which an inorganic or organic filler is dispersed within the hardcoat layer to impart the function of diffusing light within the hardcoat layer, is provided, the antireflective laminate may be provided on the anti-dazzling layer.

Further, when antistatic properties or electrostatic properties should be imparted, an electrically conductive layer may be provided on the base material film. Furthermore, electrically conductive particles may be incorporated in the hardcoat layer. The same effect can be attained by dispersing electrically conductive particles in a medium refractive index or high refractive index layer having a refractive index of 1.46 to 2.00 or by using an electrically conductive material as the high-refractive index inorganic oxide fine particles per se.

So far as the desired refractive index is provided, a method may be adopted in which an antistatic agent of an organic component is directly added to the low refractive index layer, or an antistatic layer is provided, on the outermost surface of the low refractive index layer, in a thickness of not more than 30 nm which does not affect the properties of the antireflective laminate.

The surface resistance is preferably not more than $10^{12} \Omega/\square$. Even when the surface resistance is not less than $10^{12} \Omega/\square$, antistatic properties can be imparted by imparting electrical conductive properties to any of the layers and dust is less likely to adhere as compared with the electrical conductivity-free material.

Each layer will be described in more detail.

(1) Hardcoat Layer

The hardcoat layer is formed using an ionizing radiation curing-type resin composition and has a refractive index in the range of 1.57 to 1.70. The term "hardcoat layer" as used herein refers to a layer which exhibits a hardness of H or higher as measured in a pencil hardness test specified in JIS 5600-5-4: 1999.

The ionizing radiation curing-type resin composition suitable for hardcoat layer formation is preferably an acrylate functional group-containing resin, and examples thereof include relatively low-molecular weight polyester resins, polyether resins, acrylic resins, epoxy resins, urethane resins, alkyd resins, spiroacetal resins, polybutadiene resins, polythiol polyether resins, polyhydric alcohols, di(meth)

acrylates such as ethylene glycol di(meth)acrylate and pentaerythritol di(meth)acrylate monostearate; tri(meth)acrylates such as trimethylolpropane tri(meth)acrylate and pentaerythritol tri(meth)acrylate, and polyfunctional (meth)acrylates such as pentaerythritol tetra(meth)acrylate derivatives and dipentaerithritol penta(meth)acrylate, or other polyfunctional compounds and other monomers, or epoxy acrylates, urethane acrylate or other oligomers.

A photopolymerization initiator may be properly selected from the above described examples and may be used in the ionizing radiation curing-type resin composition.

The thickness of the hardcoat layer after curing is preferably in the range of 0.1 to 100 μm, preferably 0.8 to 20 μm. When the layer thickness is not more than 0.1 μm, satisfactory hardcoat properties cannot be realized, while, when the layer thickness is not less than 100 μm, the hardcoat layer is likely to be cracked upon exposure to external impact.

In the present invention, the hardcoat layer formed of the ionizing radiation curing-type resin composition may also function as the function of the medium refractive index layer or high refractive index layer which will be described later.

(2) Anti-Dazzling Layer

The anti-dazzling layer consists essentially of an ionizing radiation curing-type resin composition and resin beads having a refractive index of 1.40 to 1.60. The incorporation of resin beads can impart anti-dazzling properties in addition to the hardcoat properties.

The ionizing radiation curing-type resin composition may be properly selected from those which are preferably used in the above-described hardcoat layer.

The reason why the refractive index of the resin beads is limited to the above-defined range is as follows. Specifically, the refractive index of the ionizing radiation curing-type resin, particularly the acrylate or methacrylate resin, is generally 1.45 to 1.55, and the selection of resin beads having a refractive index as closest as possible to the refractive index of the ionizing radiation curing-type resin can improve anti-dazzling properties without sacrificing the transparency of the coating film.

Resin beads having a refractive index close to the refractive index of the ionizing radiation curing-type resin include, for example, polymethyl methacrylate beads (1.49), polycarbonate beads (1.58), polystyrene beads (1.50), polyacrylstyrene beads (1.57), and polyvinyl chloride beads (1.54). Other resin beads may be used so far as the refractive index falls within the above-defined range.

These resin beads preferably have a particle diameter of 3 to 8 μm and are used in an amount of 2 to 10 parts by weight, generally about 4 parts by weight, based on 100 parts by weight of the resin. In the coating liquid comprising resin beads mixed in the above resin, the resin beads which have precipitated during use should be thoroughly stirred for dispersion. To eliminate this trouble, silica beads having a particle diameter of not more than 0.5 μm, preferably 0.1 to 0.25 μm, of an anti-settling agent may be added to the above coating liquid. The larger the addition amount of the silica beads, the better the effect of preventing settling of the organic filler. When the addition amount is excessively large, the transparency of the coating film is adversely affected. Therefore, the addition of silica beads in such an amount range that does not sacrifice the transparency of the coating film and can prevent settling, that is, less than about 0.1 part by weight based on 100 parts by weight of the resin, is preferred.

The thickness of the anti-dazzling layer after curing is preferably 0.1 to 100 μm, preferably 0.8 to 20 μm. When the layer thickness is not more than 0.1 μm, satisfactory hardcoat properties cannot be provided, while, when the layer thickness is not less than 100 μm, the anti-dazzling layer is likely to be cracked upon exposure to external impact.

(3) Antistatic Layer

In the antireflective laminate according to the present invention, if necessary, an antistatic layer may be formed from the viewpoint of suppressing the occurrence of static electricity to prevent the deposition of dust, or prevent damage caused by external static electricity when the antireflective laminate is incorporated in liquid crystal displays or the like. In this case, regarding the properties of the antistatic layer, the surface resistivity after the formation of the antireflective laminate is preferably not more than $10^{12} \Omega/\square$. Even when the surface resistivity is not less than $10^{12} \Omega/\square$, however, the level of dust adherence prevention is higher than the case where any antistatic layer is not provided.

Antistatic agents which may be contained in the resin composition for antistatic layer formation include, for example, various surfactant-type antistatic agents, for example, cationic group-containing various cationic antistatic agents such as quaternary ammonium salts, pyridinium salts, and primary to tertiary amino groups, anionic group-containing anionic antistatic agents such as sulfonic acid bases, sulfuric ester bases, phosphoric ester bases, and phosphonic acid bases, amphoteric antistatic agents such as amino acid and amino sulfuric ester antistatic agents, nonionic antistatic agents such as aminoalcohol, glycerin, and polyethylene glycol, organometal compounds such as alkoxides of tin or titanium and metal chelate compounds such as acetyl acetonate salts thereof, and, further, polymer-type antistatic agents prepared by increasing the molecular weight of the above antistatic agents. Further, polymerizable antistatic agents, for example, monomers and oligomers, which contain a tertiary amino group or a quaternary ammonium group, or a metal chelate part and is polymerizable upon exposure to an ionizing radiation, and organometal compounds such as coupling agents containing a functional group polymerizable upon exposure to an ionizing radiation may also be used.

Other antistatic agents which may be contained in the resin composition for antistatic layer formation include ultrafine particles having a particle diameter of not more than 100 nm, for example, tin oxide, tin-doped indium oxide (ITO), antimony-doped tin oxide (ATO), indium-doped zinc oxide (AZO), antimony oxide, and indium oxide. In particular, when the particle diameter is brought to a value not more than the wavelength of the visible light, that is, not more than 100 nm, the formed film is transparent and does not deteriorate the transparency of the antireflection film.

A coating film, which is simultaneously improved in two properties of antistatic properties and hardcoat properties or two properties of antistatic properties and anti-dazzling properties can be formed by mixing the above antistatic agent in the coating liquid for hardcoat layer formation or anti-dazzling layer formation.

(4) High Refractive Index Layer and Medium Refractive Index Layer (Refractive Index Layer Having Refractive Index in the Range of 1.46 to 2.00)

The high refractive index layer and medium refractive index layer according to the present invention are composed mainly of an ionizing radiation curing-type resin and at least one type of fine particles selected from the group consisting of ultrafine particles having a particle diameter of not more than 100 nm, for example, ultrafine particles of zinc oxide (refractive index 1.90; numerical values which will be described later representing refractive index), titania (2.3 to 2.7), ceria (1.95), tin-doped indium oxide (1.95), antimony-doped tin oxide (1.80), yttria (1.87), and zirconia (2.0). Preferably, the fine particles have a higher refractive index than the ionizing radiation curing-type resin binder. The refractive index is determined by the content of the fine particles in the refractive index layer. Specifically, since the refractive index increases with increasing the content of the fine particles, the refractive index can be regulated as desired in a range of 1.46 to 2.00 by varying the component proportion ratio between the ionizing radiation curing-type resin and the fine particles.

The ionizing radiation curing-type resin, the photopolymerization initiator, and the various additives may be the same as those described above, and the formation method may be the same as that described above.

Further, the medium refractive index layer and the high refractive index layer may be a vapor-deposited film of an inorganic oxide having a high refractive index such as titanium oxide and zirconium oxide formed by a vapor deposition method such as chemical vapor deposition (CVD) or physical vapor deposition (PVD), or a coating film with inorganic oxide fine particles having a high refractive index such as titanium oxide dispersed therein. A light transparent layer having a refractive index in the range of 1.46 to 1.80 may be used as the medium refractive index layer, and a light transparent layer having a refractive index of not less than 1.65 may be used as the high refractive index layer.

(5) Antireflection Film

The antireflection film has such a structure that one or more light transparent layers, which are transparent to light and are different from each other in refractive index, are stacked on one side or both sides of a light transparent base material film either directly or through other layer and at least one of the light transparent layers is formed of the antireflective laminate according to the present invention. The base material film and the light transparent layer should have light transparency on such a level that they are usable as the material for the antireflective film. They are preferably as transparent as possible.

The hardcoat layer may be provided on the antireflection film from the viewpoint of providing properties such as scratch resistance and strength. Alternatively, an anti-dazzling layer may be provided as other layer from the viewpoint of imparting anti-dazzling properties to the antireflection film.

Figure 1:
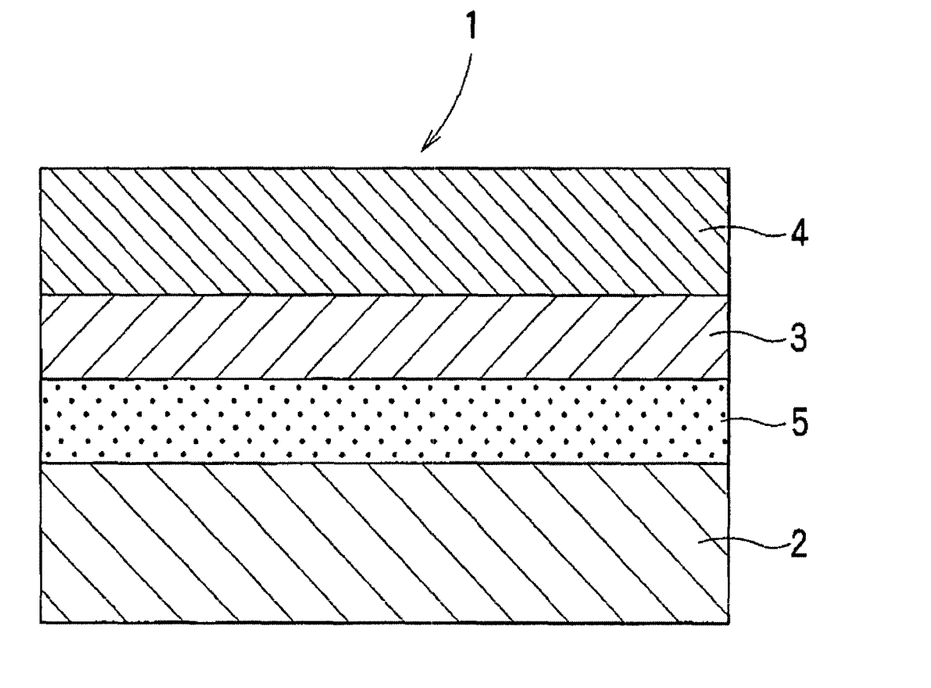
FIG. 1 is a typical cross-sectional view of one embodiment of an antireflection film formed of an antireflective laminate according to the present invention.

FIG. 1 is a typical cross-sectional view of one embodiment of an antireflection film comprising the antireflective laminate according to the present invention. In an antireflection film 1, a high refractive index layer 3 is provided on one side of a light transparent base material film 2. Further, a low refractive index layer 4 formed by coating a composition for low refractive index layer formation used in the present invention is provided on the high refractive index layer 3. A hardcoat layer 5 is provided between the base material film 2 and the high refractive index layer 3. In this embodiment, light transparent layers different from each other in refractive index are constituted by only two layers of the high refractive index layer and the low refractive index layer. Three or more layers of light transparent layers and light transparent antistatic layers may also be provided. When a light transparent layer and the like are provided in the above manner, in addition to the low refractive index layer 4, a medium refractive index layer formed by coating the composition for low refractive index layer formation used in the present invention may be further provided.

EXAMPLES

The following Examples and Comparative Examples further illustrate the present invention. However, it should be noted that they are not intended to limit the scope of the present invention in any way.

Preparation of Silica Fine Particles I

A mixture of 100 g of a silica sol having an average particle diameter of 5 nm and an $SiO_2$ concentration of 20% by weight with 1900 g of pure water was heated to 80° C. to prepare a reaction mother liquor. This reaction mother liquor had a pH value of 10.5. A 1.17 wt % (on $SiO_2$ basis) aqueous sodium silicate solution (9000 g) and 9000 g of 0.83 wt % (on $Al_2O_3$ basis) aqueous sodium aluminate solution were simultaneously added to this mother liquor, during which time this mixed solution was held at 80° C. Immediately after the addition, the pH value of the mixed solution increased to 12.5 and thereafter remained substantially unchanged. After that addition, the mixed solution was cooled to room temperature and was washed using an ultrafiltration membrane to prepare an $SiO_2.Al_2O_3$ core particle dispersion liquid having a solid content of 20% by weight.

Pure water (1700 g) was added to 500 g of the core particle dispersion liquid. The mixture was heated to 98° C., and 3000 g of a silicic acid liquid ($SiO_2$ concentration: 3.5% by weight) prepared by dealkalizing an aqueous sodium silicate solution with a cation exchange resin was added thereto while holding the temperature. Thus, a dispersion liquid of core particles with a first silica coating layer formed thereon was prepared.

This dispersion liquid was washed using an ultrafiltration membrane to prepare a dispersion liquid having a silica coated core particle solid content of 13% by weight. Pure water (1125 g) was added to 500 g of this dispersion liquid, and the dispersion liquid was adjusted to pH 1.0 by adding concentrated hydrochloric acid (35.5%) dropwise to the dispersion liquid for dealuminization. Subsequently, 10 L of an aqueous hydrochloric acid solution (pH 3) and 5 L of pure water were added to the dispersion liquid, and the mixture was filtered through an ultrafiltration membrane to separate the dissolved aluminum salt. Thus, a dispersion liquid of $SiO_2.Al_2O_3$ porous particles in which a part of the constituents of the core particle had been removed was prepared.

A mixed liquid composed of 1500 g of the above porous particle dispersion liquid, 500 g of pure water, 1750 g of ethanol, and 626 g of 28% aqueous ammonia was heated to 35° C., and 104 g of ethyl silicate ($SiO_2$: 28% by weight) was then added to the mixed liquid to coat a hydrolytic polycondensate of ethyl silicate onto the surface of the porous particles with the silica coating layer formed thereon. Thus, a dispersion liquid of porous fine particles comprising a second silica coating layer formed on the first silica coating layer was prepared.

This silica fine particle dispersion liquid was concentrated to a solid content of 5% by weight with an evaporator, and the concentrate was adjusted to pH 10 by the addition of 15 wt % aqueous ammonia.

This dispersion liquid was heat treated in an autoclave at 180° C. for 2 hr and was then cooled to room temperature. The treated dispersion liquid was ion-exchanged with 400 g of a cation exchange resin (Diaion SK1B, manufactured by Mitsubishi Chemical Corporation) for 3 hr and was then ion-exchanged with 200 g of an anion exchange resin (Diaion SA20A, manufactured by Mitsubishi Chemical Corporation) for 3 hr, followed by washing to prepare a water dispersion liquid of silica fine particles having a solid content of 20% by weight.

In this case, the $Na_2O$ content and $NH_3$ content of the water dispersion liquid of the silica fine particles were 7 ppm per silica fine particle and 1600 ppm per silica fine particle, respectively.

Subsequently, a dispersion liquid of silica fine particles I having a solid content of 20% by weight was prepared by replacing the solvent with isopropyl alcohol using an ultrafiltration membrane.

Preparation of Silica Fine Particles II

A mixture of 100 g of a silica sol having an average particle diameter of 5 nm and an $SiO_2$ concentration of 20% by weight with 1900 g of pure water was heated to 80° C. to prepare a reaction mother liquor. This reaction mother liquor had a pH value of 10.5. A 1.17 wt % (on $SiO_2$ basis) aqueous sodium silicate solution (9000 g) and 9000 g of 0.83 wt % (on $Al_2O_3$ basis) aqueous sodium aluminate solution were simultaneously added to this mother liquor, during which time this mixed solution was held at 80° C. Immediately after the addition, the pH value of the mixed solution increased to 12.5 and thereafter remained substantially unchanged. After that addition, the mixed solution was cooled to room temperature and was washed using an ultrafiltration membrane to prepare an $SiO_2.Al_2O_3$ core particle dispersion liquid having a solid content of 20% by weight.

Pure water (1700 g) was added to 500 g of the core particle dispersion liquid. The mixture was heated to 98° C., and 3000 g of a silicic acid liquid ($SiO^2$ concentration: 3.5% by weight) prepared by dealkalizing an aqueous sodium silicate solution with a cation exchange resin was added thereto while holding the temperature. Thus, a dispersion liquid of core particles with a first silica coating layer formed thereon was prepared.

This dispersion liquid was washed using an ultrafiltration membrane to prepare a dispersion liquid having a silica coated core particle solid content of 13% by weight. Pure water (1125 g) was added to 500 g of this dispersion liquid, and the dispersion liquid was adjusted to pH 1.0 by adding concentrated hydrochloric acid (35.5%) dropwise to the dispersion liquid for dealuminization. Subsequently, 10 L of an aqueous hydrochloric acid solution (pH 3) and 5 L of pure water were added to the dispersion liquid, and the mixture was filtered through an ultrafiltration membrane to separate the dissolved aluminum salt. Thus, a dispersion liquid of $SiO_2.Al_2O_3$ porous particles in which a part of the constituents of the core particle had been removed was prepared.

A mixed liquid composed of 1500 g of the above porous particle dispersion liquid, 500 g of pure water, 1750 g of ethanol, and 626 g of 28% aqueous ammonia was heated to 35° C., and 104 g of ethyl silicate ($SiO_2$: 28% by weight) was then added to the mixed liquid to coat a hydrolytic polycondensate of ethyl silicate onto the surface of the porous particles with the silica coating layer formed thereon. Thus, a dispersion liquid of porous fine particles comprising a second silica coating layer formed on the first silica coating layer was prepared.

This silica fine particle dispersion liquid was concentrated to a solid content of 5% by weight with an evaporator, and the concentrate was adjusted to pH 10 by the addition of 15 wt % aqueous ammonia.

Next, this dispersion liquid was heat treated in an autoclave at 180° C. for 2 hr and was then cooled to room temperature. The treated dispersion liquid was ion-exchanged with 400 g of a cation exchange resin (Diaion SK1B, manufactured by Mitsubishi Chemical Corporation) for 3 hr, was then ion-exchanged with 200 g of an anion exchange resin (Diaion SA20A, manufactured by Mitsubishi Chemical Corporation) for 3 hr, and was further ion-exchanged with 200 g of a cation exchange resin (Diaion SK1B manufactured by Mitsubishi Chemical Corporation) at 80° C. for 3 hr, followed by washing to prepare a water dispersion liquid of silica fine particles having a solid content of 20% by weight.

In this case, the $Na_2O$ content and $NH_3$ content of the water dispersion liquid of the silica fine particles were 6 ppm per silica fine particle and 1200 ppm per silica fine particle, respectively.

Next, the silica fine particle dispersion liquid was again hydrothermally treated at 150° C. for 11 hr and was then washed using an ultrafiltration film while adding 5 L of pure water to prepare a water dispersion liquid of silica fine particles having a solid content of 20% by weight.

In this case, the $Na_2O$ content and $NH_3$ content of the water dispersion liquid of the silica fine particles were 0.5 ppm per silica fine particle and 600 ppm per silica fine particle, respectively. Subsequently, a dispersion liquid of silica fine particles II having a solid content of 20% by weight was prepared by replacing the solvent with isopropyl alcohol using an ultrafiltration membrane.

Further, the silica fine particles I and II thus obtained were surface treated by the following method.

1. Surface Treatment A (Treatment Quantity: 5% by Weight)

For the dispersion liquid of silica fine particles I and the dispersion liquid of silica fine particle II thus obtained, solvent replacement was carried out from isopropyl alcohol to methyl isobutyl ketone using a rotary evaporator to prepare a dispersion liquid containing 20% by weight of silica fine particles.

3-Methacryloxypropylmethyldimethoxysilane was added in an amount of 5% by weight to 100% by weight of this methyl isobutyl ketone dispersion liquid, and the mixture was heat treated at 50° C. for one hr to prepare a methyl isobutyl ketone dispersion IA containing 20% by weight of surface treated hollow silica fine particles and a methyl isobutyl ketone dispersion IIA containing 20% by weight of surface treated hollow silica fine particles.

2. Surface Treatment B (Treatment Quantity: 10% by Weight)

A methyl isobutyl ketone dispersion liquid IB containing 20% by weight of surface treated hollow silica fine particles and a methyl isobutyl ketone dispersion liquid IIB containing 20% by weight of surface treated hollow silica fine particles were prepared in the same manner as in the surface treatment A, except that 10% by weight of 3-methacryloxypropylmethyldimethoxysilane was added.

3. Surface Treatment C (Treatment Quantity: 0.9% by Weight)

A methyl isobutyl ketone dispersion liquid IC containing 20% by weight of surface treated hollow silica fine particles and a methyl isobutyl ketone dispersion liquid IIC containing 20% by weight of surface treated hollow silica fine particles were prepared in the same manner as in the surface treatment A, except that 0.9% by weight of 3-methacryloxypropylmethyldimethoxysilane was added.

Example 1

Preparation of Composition for Low Refractive Index Layer Formation

The following ingredients were mixed together according to the following formulation to prepare a composition for low refractive index layer formation.

| | |
|---|---|
| Surface treated hollow silica sol (hollow silica fine particle dispersion liquid IA) | 12.85 pts. wt. |
| Pentaerythritol triacrylate (PETA) | 1.43 pts. wt. |
| Irgacure 907 (tradename, manufactured by Ciba Specialty Chemicals, K.K.) | 0.1 pt. wt. |
| F3035 (tradename, manufactured by Nippon Oils & Fats Co., Ltd.) | 0.4 pt. wt. |
| Methyl isobutyl ketone | 85.22 pts. wt. |

Preparation of Composition for Hardcoat Layer Formation

The following ingredients were mixed together according to the following formulation to prepare a composition for hardcoat layer formation.

| | |
|---|---|
| Pentaerythritol triacrylate (PETA) | 5.0 pts. wt. |
| Irgacure 184 (tradename, manufactured by Ciba Specialty Chemicals, K.K.) | 0.25 pts. wt. |
| Methyl isobutyl ketone | 94.75 pts. wt. |

Preparation of Base Material/Hardcoat Layer/Low Refractive Index Layer Film

The above composition for hardcoat layer formation was bar coated onto an 80 μm-thick cellulose triacetate (TAC) film, and the coating was dried to remove the solvent. Thereafter, the dried coating was exposed to ultraviolet light with an ultraviolet light irradiation device (Fusion UV Systems Japan KK, light source H bulb) at a dose of 100 mJ/cm$^2$ to cure the dried coating and thus to form an about 5 μm-thick hardcoat layer. Thus, a base material/hardcoat layer film was prepared.

The composition for low refractive index layer formation was bar coated onto the base material/hardcoat layer film. The coating was dried to remove the solvent, and the dried coating was then irradiated with ultraviolet light at a dose of 200 mJ/cm$^2$ with an ultraviolet irradiation device (Fusion UV Systems Japan KK, light source H bulb) to cure the coating film and thus to form a laminate of base material/hardcoat layer/low refractive index layer.

Example 2

A hardcoat layer and a low refractive index layer were formed in the same manner as in Example 1, except that the composition for low refractive index layer formation used in Example 1 was changed as follows. Thus, a laminate of Example 2 was prepared.

| | |
|---|---|
| Surface treated hollow silica sol (hollow silica fine particle dispersion liquid IB) | 12.85 pts. wt. |
| Pentaerythritol triacrylate (PETA) | 1.43 pts. wt. |
| Irgacure 907 (tradename, manufactured by Ciba Specialty Chemicals, K.K.) | 0.1 pt. wt. |
| F3035 (tradename, manufactured by Nippon Oils & Fats Co., Ltd.) | 0.4 pt. wt. |
| Methyl isobutyl ketone | 85.22 pts. wt. |

Example 3

A hardcoat layer and a low refractive index layer were formed in the same manner as in Example 1, except that the composition for low refractive index layer formation used in Example 1 was changed as follows. Thus, a laminate of Example 3 was prepared.

| | |
|---|---|
| Surface treated hollow silica sol (hollow silica fine particle dispersion liquid IB) | 12.85 pts. wt. |
| Dipentaerythritol hexaacrylate (DPHA) | 1.43 pts. wt. |
| Irgacure 907 (tradename, manufactured by Ciba Specialty Chemicals, K.K.) | 0.1 pt. wt. |
| F3035 (tradename, manufactured by Nippon Oils & Fats Co., Ltd.) | 0.4 pt. wt. |
| Methyl isobutyl ketone | 85.22 pts. wt. |

Example 4

A hardcoat layer and a low refractive index layer were formed in the same manner as in Example 1, except that the composition for low refractive index layer formation used in Example 1 was changed as follows. Thus, a laminate of Example 4 was prepared.

| | |
|---|---|
| Surface treated hollow silica sol (hollow silica fine particle dispersion liquid IB) | 12.85 pts. wt. |
| Pentaerythritol triacrylate (PETA) | 1.43 pts. wt. |
| Irgacure 907 (tradename, manufactured by Ciba Specialty Chemicals, K.K.) | 0.1 pt. wt. |
| TSF 4460 (tradename, manufactured by GE Toshiba Silicone Co., Ltd.) | 0.12 pt. wt |
| Methyl isobutyl ketone | 85.5 pts. wt. |

Example 5

A hardcoat layer and a low refractive index layer were formed in the same manner as in Example 1, except that the composition for low refractive index layer formation used in Example 1 was changed as follows. Thus, a laminate of Example 5 was prepared.

| | |
|---|---|
| Surface treated hollow silica sol (hollow silica fine particle dispersion liquid IIA) | 12.85 pts. wt. |
| Pentaerythritol triacrylate (PETA) | 1.43 pts. wt. |
| Irgacure 907 (tradename, manufactured by Ciba Specialty Chemicals, K.K.) | 0.1 pt. wt. |
| F3035 (tradename, manufactured by Nippon Oils & Fats Co., Ltd.) | 0.4 pt. wt. |
| Methyl isobutyl ketone | 85.22 pts. wt. |

Example 6

A hardcoat layer and a low refractive index layer were formed in the same manner as in Example 1, except that the composition for low refractive index layer formation used in Example 1 was changed as follows. Thus, a laminate of Example 6 was prepared.

| | |
|---|---|
| Surface treated hollow silica sol (hollow silica fine particle dispersion liquid IIB) | 12.85 pts. wt. |
| Pentaerythritol triacrylate (PETA) | 1.43 pts. wt. |
| Irgacure 907 (tradename, manufactured by Ciba Specialty Chemicals, K.K.) | 0.1 pt. wt. |
| F3035 (tradename, manufactured by Nippon Oils & Fats Co., Ltd.) | 0.4 pt. wt. |
| Methyl isobutyl ketone | 85.22 pts. wt. |

Example 7

Preparation of Composition for Antistatic Layer Formation

The following ingredients were mixed together according to the following formulation to prepare a composition for antistatic layer formation.

| | |
|---|---|
| Antimony-doped tin oxide dispersion liquid (solid content 45%, PELTRON C-4456S-7: tradename, manufactured by NIPPON PELNOX CORP.) | 25 pts. wt. |
| HDDA (KS-HDDA: tradename, manufactured by Nippon Kayaku Co., Ltd.) | 10.5 pts. wt. |
| Irgacure 184 (tradename, manufactured by Ciba Specialty Chemicals, K.K.) | 0.84 pt. wt. |
| Butyl acetate | 76.5 pts. wt. |
| Cyclohexanone | 32.8 pts. wt. |

Preparation of Laminate (Base Material/Antistatic Layer/Hardcoat Layer/Low Refractive Index Layer)

The above composition for antistatic layer formation was bar coated onto a TAC film, and the coating was dried to remove the solvent. The dried coating was then exposed to ultraviolet light at a dose of about 20 mJ/cm$^2$ with an ultraviolet light irradiation device to cure the coating and thus to form an about 1 μm-thick antistatic layer.

Next, a laminate of Example 7 was prepared by forming a hardcoat layer and a low refractive index layer on the base material/antistatic layer film thus obtained in the same manner as in Example 2.

Evaluation of Antistatic Properties (1) Dust Wipe Test

Dust of tissue paper was sprinkled over the laminate 5, and the surface of the laminate was lightly wiped by Bemcot. As a result, the dust could easily be wiped off.

(2) Measurement of Charge Attenuation

The charge attenuation of the laminate 5 and the antistatic layer-free base material/hardcoat layer film was measured with a honestmeter (manufactured by Shishido Seidenki K.K.) under the following measuring conditions.

Applied voltage: +10 kV
Probe position: 20 cm
Measuring time: 5 min

The results are shown in the following table which indicates the effect of the antistatic layer.

TABLE 1

| Sample | Saturation voltage(kV) | Half value period (s) |
|---|---|---|
| Laminate 5 | 1.12 | 42.8 |
| Base material/ hardcoat layer film | 1.96 | Impossible to measure |

Example 8

Preparation of Composition for Medium Refractive Index Antistatic Layer Formation The following ingredients were mixed together according to the following formulation to prepare a composition for antistatic layer formation.

| | |
|---|---|
| Indium oxide dispersion liquid (solid content 35%, EI-3: tradename, manufactured by Dai Nippon Toryo Co., Ltd.) | 14.3 pts. wt. |
| Isopropyl alcohol | 85.7 pts. wt. |

Preparation of Laminate (Base Material/Hardcoat Layer/Antistatic Layer/Low Refractive Index Layer)

A hardcoat layer was formed on a 100 μm-thick PET film in the same manner as in Example 1. Next, the above composition for antistatic layer formation was bar coated, and the coating was dried to remove the solvent. Thereafter, the dried coating was exposed to ultraviolet light at a dose of 100 mJ/cm$^2$ with an ultraviolet irradiation device to cure the coating and thus to form an antistatic layer having a thickness of about 80 nm and a refractive index of 1.65.

A low refractive index layer was formed on the laminate (base material/hardcoat layer/antistatic layer) thus obtained in the same manner as in Example 2. Thus, a laminate of Example 8 was prepared.

Evaluation of Antistatic Properties (1) Dust Wipe Test

Dust of tissue paper was sprinkled over the laminate 5, and the surface of the laminate was lightly wiped by Bemcot. As a result, the dust could easily be wiped off.

(2) Measurement of Surface Resistivity

The surface resistivity (Ω/□) of the coating film was measured for the outermost surface of the laminate with a high resistivity meter (Hiresta UP, manufactured by Mitsubishi Chemical Corporation) at an applied voltage of 100 V. As a result, it was found that the surface resistivity was $2.0 \times 10^9$ (Ω/□).

Example 9

Preparation of Composition for Anti-Dazzling Layer Formation

The following ingredients were mixed together according to the following formulation to prepare a composition for anti-dazzling layer formation.

| | |
|---|---|
| Dipentaerythritol hexaacrylate (DPHA) | 25 pts. wt. |
| Styrene beads (particle diameter 3.5 μm) | 6 pts. wt. |
| Toluene | 50 pts. wt. |
| Irgacure 184 (tradename, manufactured by Ciba Specialty Chemicals, K.K.) | 2 pts. wt. |

Preparation of Laminate (Base Material/Anti-Dazzling Layer/Low Refractive Index Layer)

The above composition for anti-dazzling layer formation was bar coated onto a TAC film, and the coating was dried to remove the solvent. The dried coating was then exposed to ultraviolet light at a dose of 100 mJ/cm$^2$ with an ultraviolet light irradiation device to cure the coating and thus to form an about 4 μm-thick anti-dazzling layer. Thus, a base material/anti-dazzling layer film was prepared.

Next, a laminate of Example 9 was prepared by forming a low refractive index layer on the base material/anti-dazzling layer film thus obtained in the same manner as in Example 2.

Example 10

Preparation of Composition for Medium Refractive Index Hardcoat Layer Formation

The following ingredients were mixed together according to the following formulation to prepare a composition for the formation of a medium refractive index hardcoat layer having a refractive index of 1.63.

| | |
|---|---|
| KZ7973 (tradename, manufactured by JSR corporation) | 47 pts. wt. |
| Pentaerithritol triacrylate (PETA) | 5 pts. wt. |
| Irgacure 184 (tradename, manufactured by Ciba Specialty Chemicals, K.K.) | 1 pt. wt. |
| Cyclohexanone | 12 pts. wt. |

Preparation of Laminate (Base Material/Medium Refractive Index Hardcoat Layer/Low Refractive Index Layer)

The above composition for medium refractive index hardcoat layer formation was bar coated onto a TAC film, and the coating was dried to remove the solvent. The dried coating was then exposed to ultraviolet light at a dose of 100 mJ/cm$^2$ with an ultraviolet light irradiation device to cure the coating and thus to form an about 5 μm-thick medium refractive index hardcoat layer. Thus, a base material/medium refractive index hardcoat layer film was prepared.

Next, a laminate of Example 10 was prepared by forming a low refractive index layer on the base material/medium refractive index hardcoat layer film in the same manner as in Example 2.

Example 11

Preparation of Composition for Antifouling Layer Formation

The following ingredients were mixed together according to the following formulation to prepare a composition for antifouling layer formation.

| | |
|---|---|
| KP-801M (tradename, manufactured by The Shin-Etsu Chemical Co., Ltd.) | 6.7 pts. wt. |
| FC-40 (tradename, manufactured by Sumitomo 3M Ltd.) | 93.3 pts. wt. |

Preparation of Laminate (Base Material/Hardcoat Layer/Low Refractive Index Layer/Antifouling Layer)

A hardcoat layer and a low refractive index layer were formed on a base material in the same manner as in Example 2.

Thereafter, the above composition for antifouling layer formation was bar coated, and the coating was heat cured at 70° C. for 4 min. Thus, a laminate of Example 11 was prepared.

Example 12

Preparation of Composition for High Refractive Index Layer Formation

The following ingredients were mixed together according to the following formulation to prepare a composition for the formation of a high refractive index layer having a refractive index of 1.90.

| | |
|---|---|
| Rutile form of titanium oxide (tradename: MT-500HDM, manufactured by Teika Corporation) | 10 pts. wt. |
| Disperbyk 163 (tradename, manufactured by Bik-Chemie Japan K.K.) | 2 pts. wt. |
| Pentaerithritol triacrylate (PETA) | 4 pts. wt. |
| Irgacure 184 (tradename, manufactured by Ciba Specialty Chemicals, K.K.) | 0.2 pt. wt. |
| Methyl isobutyl ketone | 37.3 pts. wt. |

Preparation of Composition for Medium Refractive Index Layer Formation

Dipentaerythritol pentacryl paste (SR399E: tradename, manufactured by Nippon Kayaku Co., Ltd.) (2.5 parts by weight) was added to 10 parts by weight of the above titania dispersion liquid (refractiver index 1.90) to prepare a composition for the formation of a medium refractive index layer having a refractive index of 1.76.

Preparation of Laminate (Base Material/Hardcoat Layer/Medium Refractive Index Layer/High Refractive Index Layer/Low Refractive Index Layer)

The above composition for medium refractive index layer formation was bar coated onto a base material/hardcoat layer film prepared in the same manner as in Example 1. The coating was dried to remove the solvent. Thereafter, the dried coating was exposed to ultraviolet light at a dose of 100 mJ/cm$^2$ with an ultraviolet light irradiation device to cure the coating and thus to form an about 80 nm-thick medium refractive index layer.

The above composition for high refractive index layer formation was coated under the same conditions described above to form an about 60 nm-thick high refractive index layer.

A low refractive index layer was formed on the laminate (base material/hardcoat layer/medium refractive index layer/high refractive index layer) thus obtained in the same manner as in Example 2. Thus, a laminate of Example 12 was prepared.

Example 13

Preparation of Composition for High Refractive Index Layer Formation

The following ingredients were mixed together according to the following formulation to prepare a composition for the formation of a high refractive index layer having a refractive index of 1.70.

| | |
|---|---|
| Rutile form of titanium oxide (tradename: MT-500HDM, manufactured by Teika Corporation) | 10 pts. wt. |
| Disperbyk 163 (tradename, manufactured by Bik-Chemie Japan K.K.) | 2 pts. wt. |
| Pentaerithritol triacrylate (PETA) | 7.5 pts. wt. |
| Irgacure 184 (tradename, manufactured by Ciba Specialty Chemicals, K.K.) | 0.2 pt. wt. |
| Methyl isobutyl ketone | 37.3 pts. wt. |

Preparation of Laminate (Base Material/Hardcoat Layer/High Refractive Index Layer/Low Refractive Index Layer)

The above composition for high refractive index layer formation was bar coated onto a base material/hardcoat layer film prepared in the same manner as in Example 1. The coating was dried to remove the solvent. Thereafter, the dried coating was exposed to ultraviolet light at a dose of 100 mJ/cm$^2$ with an ultraviolet light irradiation device to cure the coating and thus to form an about 80 nm-thick high refractive index layer.

A low refractive index layer was formed on the laminate (base material/hardcoat layer/high refractive index layer) thus obtained in the same manner as in Example 2. Thus, a laminate of Example 13 was prepared.

Comparative Example 1

A hardcoat layer and a low refractive index layer were formed in the same manner as in Example 1, except that the composition for low refractive index layer formation was changed as follows. Thus, a laminate of Comparative Example 1 was prepared.

| | |
|---|---|
| Surface untreated hollow silica sol (dispersion liquid of silica fine particles I) | 12.85 pts. wt. |
| Pentaerythritol triacrylate (PETA) | 1.43 pts. wt. |
| Irgacure 907 (tradename, manufactured by Ciba Specialty Chemicals, K.K.) | 0.1 pt. wt. |
| F3035 (tradename, manufactured by Nippon Oils & Fats Co., Ltd.) | 0.4 pt. wt. |
| Methyl isobutyl ketone | 85.22 pts. wt. |

Comparative Example 2

A hardcoat layer and a low refractive index layer were formed in the same manner as in Example 1, except that the composition for low refractive index layer formation was changed as follows. Thus, a laminate of Comparative Example 2 was prepared.

| | |
|---|---|
| Surface treated hollow silica sol (hollow silica fine particle dispersion liquid IC) | 12.85 pts. wt. |
| Pentaerythritol triacrylate (PETA) | 1.43 pts. wt. |
| Irgacure 907 (tradename, manufactured by Ciba Specialty Chemicals, K.K.) | 0.1 pt. wt. |
| F3035 (tradename, manufactured by Nippon Oils & Fats Co., Ltd.) | 0.4 pt. wt. |
| Methyl isobutyl ketone | 85.22 pts. wt. |

Comparative Example 3

A hardcoat layer and a low refractive index layer were formed in the same manner as in Example 1, except that the composition for low refractive index layer formation was changed as follows. Thus, a laminate of Comparative Example 3 was prepared.

| | |
|---|---|
| Surface treated hollow silica sol (hollow silica fine particle dispersion liquid IB) | 12.85 pts. wt. |
| Polyethylene glycol diacrylate (PEGDA) | 1.43 pts. wt. |
| Irgacure 907 (tradename, manufactured by Ciba Specialty Chemicals, K.K.) | 0.1 pt. wt. |
| F3035 (tradename, manufactured by Nippon Oils & Fats Co., Ltd.) | 0.4 pt. wt. |
| Methyl isobutyl ketone | 85.22 pts. wt. |

Comparative Example 4

A hardcoat layer and a low refractive index layer were formed in the same manner as in Example 1, except that the composition for low refractive index layer formation was changed as follows. Thus, a laminate of Comparative Example 4 was prepared.

| | |
|---|---|
| Surface treated hollow silica sol (hollow silica fine particle dispersion liquid IB) | 12.85 pts. wt. |
| Pentaerythritol triacrylate (PETA) | 1.43 pts. wt. |
| Irgacure 907 (tradename, manufactured by Ciba Specialty Chemicals, K.K.) | 0.1 pt. wt. |
| Methyl isobutyl ketone | 85.62 pts. wt. |

Comparative Example 5

A hardcoat layer and a low refractive index layer were formed in the same manner as in Example 1, except that the composition for low refractive index layer formation was changed as follows. Thus, a laminate of Comparative Example 5 was prepared.

| | |
|---|---|
| Surface untreated hollow silica sol (dispersion liquid of silica fine particles I) | 7.5 pts. wt. |
| Pentaerythritol triacrylate (PETA) | 2.5 pts. wt. |
| Irgacure 907 (tradename, manufactured by Ciba Specialty Chemicals, K.K.) | 0.15 pt. wt. |
| F3035 (tradename, manufactured by Nippon Oils & Fats Co., Ltd.) | 0.4 pt. wt. |
| Methyl isobutyl ketone | 88.45 pts. wt. |

Each of the laminates thus obtained was subjected to reflectance, scratch resistance and antifouling property evaluation test.

(1) Measurement of Reflectance

The absolute reflectance was measured with a spectrophotometer (UV-3100PC) manufactured by Shimadzu Seisakusho Ltd. The thickness of the low refractive index layer was set so that the minimum value of the reflectance was present around a wavelength of 550 nm.

The refractive index of the low refractive index layer was determined using simulation from a reflectance curve prepared from measurement results.

(2) Scratch Resistance Evaluation Test

Steel wool of #0000 was provided and was reciprocated 20 times under a load of 200 g/cm$^2$. The sample was visually inspected for scratches. The results were evaluated according to the following criteria.

⊚: No scratch was observed.

○: Fine scratches (not more than 5 scratches) were observed.

Δ: Although significant scratches were observed, separation was not observed.

x: Separation was observed.

(3) Antifouling Property Evaluation Test

Marking was drawn on the surface of a sample with an oil-based marking ink and was then wiped off with Bemcot wipers, and the state of the surface of the sample after the wiping-off was observed. The results were evaluated according to the following criteria.

⊚: Ink was repelled from the surface and could be easily wiped off.

○: Ink was repelled from the surface and could be wiped off by fully rubbing the surface of the sample.

Δ: A part of ink remained unremoved.

x: Ink could not be wiped off.

The results are shown below.

TABLE 2

| | Refractive index | Scratch resistance test | Antifouling test |
|---|---|---|---|
| Example 1 | 1.36 | ○ | ○ |
| Example 2 | 1.36 | ○ | ○ |
| Example 3 | 1.36 | ○ | ○ |
| Example 4 | 1.36 | ○ | ○ |
| Example 5 | 1.36 | ⊚ | ⊚ |
| Example 6 | 1.36 | ⊚ | ⊚ |
| Example 7 | 1.36 | ○ | ○ |
| Example 8 | 1.36 | ○ | ○ |
| Example 9 | 1.36 | ○ | ○ |
| Example 10 | 1.36 | ○ | ○ |
| Example 11 | 1.36 | ○ | ○ |
| Comparative Example 1 | 1.36 | X | Δ |
| Comparative Example 2 | 1.36 | X | Δ |
| Comparative Example 3 | 1.36 | X | ○ |
| Comparative Example 4 | 1.36 | Δ | X |

TABLE 2-continued

| | Refractive index | Scratch resistance test | Antifouling test |
|---|---|---|---|
| Comparative Example 5 | 1.46 | ○ | ○ |

The invention claimed is:

1. A process for producing an antireflective laminate that includes a light transparent base material and at least a low refractive index layer having a refractive index of not more than 1.45 provided on said light transparent base material, said process comprising:
   (1) preparing a composition for the low refractive index layer that comprises an ionizing radiation curing resin composition and silica fine particles having an outer shell layer with the interior of said silica fine particles being porous or void,
   (2) applying the composition on the light transparent base material to form a coating layer and drying the coating layer, and
   (3) irradiating the coating layer with an ionizing radiation and/or heating the coating layer to form the low refractive index layer,
   wherein said silica fine particles are obtained by the following steps (a) to (d):
   (a) adding an aqueous sodium silicate solution and an aqueous sodium aluminate solution to a silica raw material to prepare colloid particles comprising a composite oxide,
   (b) selectively removing at least a part of elements other than silicon and oxygen from the colloid particles of the composite oxide,
   (c) adding a hydrolytic organosilicon compound or a silicic acid liquid to the colloid particles from which a part of the elements has been removed to prepare a composite oxide sol, and
   (d) repeatedly carrying out a hydrothermal treatment of the composite oxide sol at temperatures of 50 to 300° C. to obtain silica fine particles having an $Na_2O$ content of 0.5-2 ppm and an ammonia content of 600-1000 ppm.

2. The process for producing an antireflective laminate according to claim 1, wherein said silica fine particles have been subjected to surface treatment with 1 to 50% by weight, based on said silica fine particles, of said silane coupling agent.

3. The process for producing an antireflective laminate according to claim 1, wherein said silica fine particles have an average diameter of 5 to 100 nm.

4. The process for producing an antireflective laminate according to claim 1, wherein said outer shell layer in said silica fine particles has a thickness of 1/60 to 1/3 of the average particle diameter of said silica fine particles.

* * * * *